Jan. 1, 1929.  
D. L. BENTON  
BUMPER  
Filed June 22, 1927  
1,697,587

INVENTOR.  
Donald L. Benton.  
BY  
ATTORNEYS.

Patented Jan. 1, 1929.

1,697,587

UNITED STATES PATENT OFFICE.

DONALD L. BENTON, OF LOS ANGELES, CALIFORNIA.

BUMPER.

Application filed June 22, 1927. Serial No. 200,610.

This invention relates to an automobile accessory, and particularly pertains to an automobile bumper.

It is the principal object of the present invention to provide an automobile bumper adapted to be supported transversely of the end of an automobile in a manner to absorb the shock of impact occurring in collisions, and to thus prevent undue shock and strain from being dealt to the automobile frame, and while protecting the automobile mud guards, the present invention being particularly concerned with a bumper of the all-spring type, which is capable of resiliently yielding in all directions in a horizontal plane, and which bumper is decidedly sturdy in its construction.

It is the further object of the present invention to provide an automobile bumper which is equipped with illuminating means, said means being protected from damage at the time of collision.

The present invention contemplates the construction of an automobile bumper formed of a pair of bumper bars disposed one above the other, in a vertical plane, and which bars terminate at the ends of their impact sections in recurved loops—said loops at each end of the bumper being offset with relation to the bars of which they are a part, the terminating ends of the bars being connected by a resilient back bar.

The structure also contemplates provision for illuminating means carried by the bumper at points between the impact sections of the bumper and the vehicle, and in such a manner as to insure that the impact sections will protect the illuminating means.

The invention is illustrated by way of example in the accompanying drawings, in which.

Referring more particularly to the drawings, 10 and 11 indicate parallel impact bars of the bumper. These bars have straight central impact sections, as indicated at 12, which sections terminate in recurving loop portions 13 and 14. The loop portions are offset laterally, with relation to the straight central sections 12, and thus make a bumper structure in which the loop sections of parallel bars, 10 and 11, stand a greater distance from each other than the straight sections 12 of the two bumper bars. This makes a bumper structure having a relatively narrow impact section across the center of the bumper when vertical width is considered, and terminated at opposite ends in oppositely vertical flaring end portions.

Figure 1:
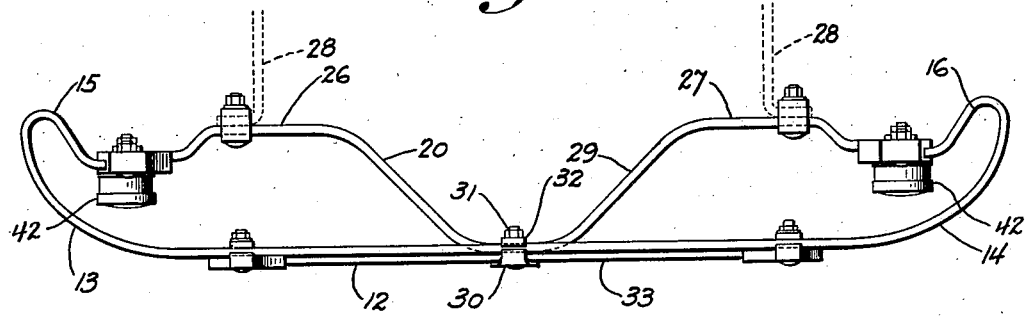
Figure 1 is a view in plane, showing the present invention.

As shown in Fig. 1 of the drawing, the end sections 13 and 14 are recurved to form loops 15 and 16. The free ends of the bars 10 and 11 are then positioned in seats 17 and 18 of a fastening plate 19.

A back bar 20 is secured to the fastening plate and is positioned in a seat, 21, of the plate 19. A clamping plate 22 is disposed over the ends of the front bars 10 and 11, and the back bar 20, after which the two plates are fastened together by bolts 23, 24 and 25, which pass through the two plates and openings in the bars.

Figure 4:
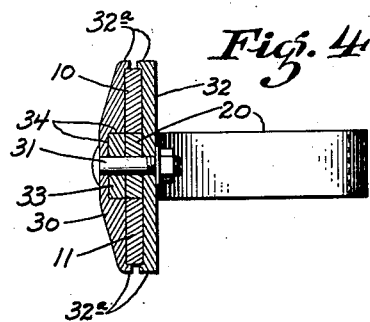
Fig. 4 is a view in vertical section through the bumper, as seen on the line 4—4, of Fig. 2.
Figure 3:
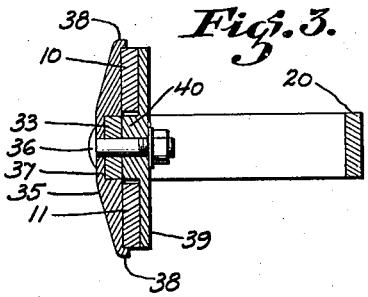
Fig. 3 is a view through the bumper, as seen on the line 3—3 of Fig. 2.
Figure 5:
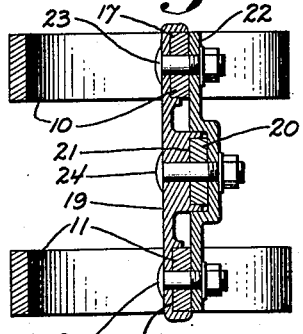
Fig. 5 is a view in vertical section through the front and back bar connecting means, as seen on the line 5—5 of Fig. 2, and as particularly disclosing the manner in which illuminating means is supported by the bumper.

The back bar is formed with straight sections 26 and 27, which receive suitable mountings 28, as indicated by dotted lines in Fig. 1. In the form of the invention shown in the present drawings, the central portion of the back bar is bent forwardly, to form a reinforcing truss section 29, which extends forwardly and is situated between front bars 10 and 11 as indicated in Fig. 4 of the drawing.

A bolting plate 30 extends across the front bars 10 and 11, at a point midway between their ends, and receives a bolt 31, which passes through the plate, and the central portion of the back bar. A supplemental plate 32 is disposed across the backs of the three bars 10, 11 and 20, at the point where they are in vertical alignment, to assist in holding these three bars in rigid relation to each other.

Overhanging flanges 32 are formed upon the opposite ends of each of the plates 30 and 32, to prevent them from becoming displaced.

In some forms of the present invention it may be considered desirable to reinforce the impact section, and this has been done as shown in the drawings, by providing a supplemental impact bar 33, which extends parallel to the straight impact sections 12 of the bumper bars 10 and 11, and is disposed in a position to substantially breach the gap normally existing between the straight portions of said bars. As shown in Figure 4 of the drawings, the bolting plate 30 has been formed with a recess 34, to accommodate the supplemental impact bar 33, and to fix it with relation to the back bar 20, and the front bars 10 and 11. The opposite ends of the supplemental impact bar are concealed beneath fitting plates 35 by bolts 36.

The plates 35 are formed with recesses 37 in which the supplemental bar seats. The plate also rests against the front faces of the main bumper bars 10 and 11, and is positioned with relation thereto by overhanging lips 38.

A back plate 39, is disposed upon the opposite sides of the bumper bars and is formed with a central extension 40, which projects between the bumper bars 10 and 11, and engages the back face of the supplemental bar 33.

Figure 2:
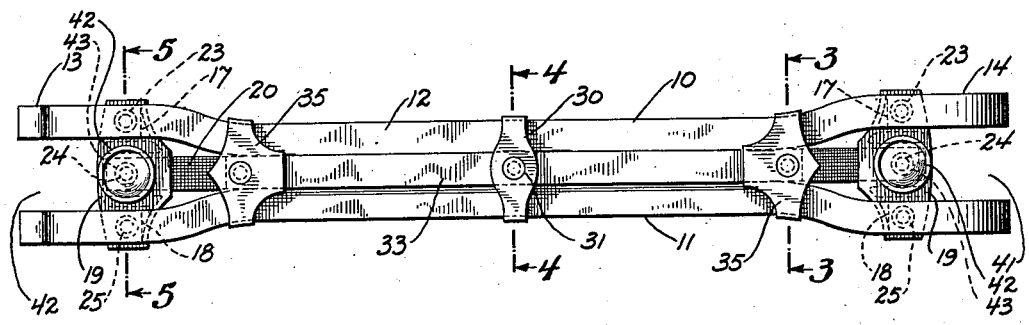
Fig. 2 is a front elevation, showing the bumper with which the present invention is concerned.

By reference to Fig. 2 of the drawing it will be noted that the opposite portions at the ends of the bumper form a relatively wide space between the end portions as indicated at 41. It has been found desirable to mount illuminating means in the rear of these spaced openings 41, so that the roadway along the opposite sides of the path of travel of the automobile may be illuminated, or so that the contour of the automobile may be delineated, especially when the bumper is mounted across the rear of the vehicle.

It will, of course be evident that the method of illumination is immaterial, although the drawings in the present case show the use of electric lights 42 or jewels 43, which are supported upon the plates 19 in a manner to disclose the light to view between the looped end portions of the impact bars.

It is understood that the bumper as here disclosed is constructed of flat resilient steel bars, whereby the bars may have vertical rigidity while being capable of resiliently yielding horizontally. It will, of course, be apparent that various parts of the bumper might be constructed of non-resilient material if desired.

It will thus be seen that the structure here disclosed provides a bumper of the all resilient type, which is decidedly simple in construction, and is strongly built so that it will withstand excessive impact shock, and it will be further evident that this bumper provides convenient protected means for additional illumination of the vehicle.

While I have shown the preferred form of my invention as now known to me, it will be understood that various changes might be made in the combination, construction and arrangement of all parts without departing from the spirit of the invention as outlined.

Having thus described my invention, what I claim and desire to secure by Letters Patent is:

1. An automobile bumper comprising a central impact section of resilient material disposed vertically edgewise, said impact member terminating at its opposite ends in end portions of greater vertical width than the width of the central impact section, said widened portions being recurved rearwardly and inwardly at their outer ends.

2. An automobile bumper comprising a horizontally resilient impact section, formed of flat strip material, said impact section terminating at its opposite ends in vertically flaring bifurcated recurved loops, and means engaging the ends of said bars for resiliently mounting said bumper structure transversely of an automobile frame.

3. An automobile bumper comprising a pair of parallel bumper bars disposed in relatively close relation to each other, and spaced edgewise vertically, said bars terminating in rearwardly and inwardly looped end portions formed as continuations of the bars, and being oppositely offset to provide an end impact section of relatively greater width than that formed by the central portions of the bars and means substantially at the points of offset of said bars for rigidly holding said bars in their spaced relation to each other.

4. An automobile bumper comprising a pair of parallel bumper bars disposed in relatively close relation to each other, and spaced edgewise vertically, said bars terminating in looped end portions formed as continuations of the bars and being oppositely offset to provide an end impact section of relatively greater width than that formed by the central portions of the bars and means intermediate the ends of the bumper bars for holding them in rigid spaced relation to each other, and means at the ends of the bars and at the terminations of the recurved loops for rigidly holding said recurved portions in spaced relation to each other.

5. An automobile bumper comprising a pair of parallel bumper bars disposed in relatively close relation to each other, and spaced edgewise vertically, said bars terminating in looped end portions formed as continuations of the bars and being oppositely offset to provide an end impact section of relatively greater width than that formed by the central portions of the bars and means intermediate the ends of the bumper bars for holding them in rigid spaced relation to each other, means at the ends of the bars and at the terminations of the recurved loops for rigidly holding said recurved portions in spaced relation to each other, and illuminating means carried by the recurved portions of the bumper bars and adapted to be disclosed between the impact sections of the bars.

6. An automobile bumper comprising a central impact section of resilient material disposed vertically edgewise, said impact member terminating at its opposite ends in end portions of greater vertical width than the width of the central impact section, said widened portions being recurved rearwardly and inwardly at their outer ends, a cross member connecting the ends of the recurved portions of the bars in the rear thereof and lamps carried on said cross members to project a beam between the widened portions of the bars.

7. An automobile bumper comprising a central impact section of resilient material disposed vertically edgewise, said impact member terminating at its opposite ends in end portions of greater vertical width than the width of the central impact section, said widened portions being recurved rearwardly and inwardly at their outer ends, cross members connecting the ends of the recurved portions of the bars in the rear thereof, lamps carried on said cross members to project a beam between the widened portions of the bars, and a back bar connecting said cross members to provide a mounting for the bumper.

8. An automobile bumper comprising a pair of parallel bumper bars disposed in relatively close relation to each other, and spaced edgewise vertically, said bars terminating in rearwardly and inwardly looped end portions formed as continuations of the bars, and being oppositely offset to provide an end impact section of relatively greater width than that formed by the central portions of the bars and means substantially at the points of offset of said bars for rigidly holding said bars in their spaced relation to each other and a bar fastened to said holding means at its opposite ends and supported in position centrally of the central impact section of the bumper.

DONALD L. BENTON.